(12) United States Patent
Su

(10) Patent No.: US 11,173,390 B2
(45) Date of Patent: Nov. 16, 2021

(54) GAME CONTROLLER

(71) Applicant: Primax Electronics Ltd., Taipei (TW)

(72) Inventor: Dong-Xu Su, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 61 days.

(21) Appl. No.: 16/799,699

(22) Filed: Feb. 24, 2020

(65) Prior Publication Data

US 2021/0197080 A1 Jul. 1, 2021

(30) Foreign Application Priority Data

Dec. 31, 2019 (CN) .......................... 201911407027.1

(51) Int. Cl.
*A63F 13/24* (2014.01)

(52) U.S. Cl.
CPC ...... *A63F 13/24* (2014.09); *A63F 2300/1043* (2013.01)

(58) Field of Classification Search
CPC .......................... A63F 13/24; A63F 2300/1043
See application file for complete search history.

(56) References Cited

U.S. PATENT DOCUMENTS

| | | | | |
|---|---|---|---|---|
| 5,491,462 | A * | 2/1996 | Cecchi ................... | G05G 9/047 338/128 |
| 5,868,620 | A * | 2/1999 | Wada ..................... | A63F 13/10 463/38 |
| 5,883,690 | A * | 3/1999 | Meyers .................. | A63F 13/02 345/161 |
| 6,342,009 | B1 * | 1/2002 | Soma ..................... | A63F 13/24 463/38 |
| 9,764,230 | B2 * | 9/2017 | Gassoway ............. | G06F 3/0338 |
| 2002/0103025 | A1 * | 8/2002 | Murzanski ............. | A63F 13/06 463/37 |
| 2006/0125785 | A1 * | 6/2006 | McAlindon ........... | G06F 3/0235 345/156 |
| 2008/0280681 | A1 * | 11/2008 | Kidakarn ............... | A63F 13/06 463/37 |
| 2012/0274563 | A1 * | 11/2012 | Olsson .................. | G05G 9/047 345/161 |
| 2016/0361634 | A1 * | 12/2016 | Gassoway ............. | A63F 13/22 |
| 2018/0353850 | A1 * | 12/2018 | Strahle .................. | A63F 13/98 |

* cited by examiner

*Primary Examiner* — Omkar A Deodhar
*Assistant Examiner* — Shauna-Kay Hall
(74) *Attorney, Agent, or Firm* — Kirton McConkie; Evan R. Witt

(57) ABSTRACT

A game controller includes a casing, a base, a movable seat, a signal control module and an operation element. The base, the movable seat, and the signal control module are installed within the casing. The signal control module is installed on the movable seat. The operation element is connected with the signal control module. A portion of the operation element is exposed to an operation hole in an upper cover of the casing. Consequently, a position-limiting movement of the movable seat relative to the base is achieved, and an altitude of the operation element is adjustable.

14 Claims, 10 Drawing Sheets

GAME CONTROLLER

FIELD OF THE INVENTION

The present invention relates to a game signal input device, and more particularly to a game controller with an operation interface.

BACKGROUND OF THE INVENTION

With the improvement of living standards, people have more and more leisure activities in their free time. Moreover, with increasing development of science and technology, the video games that integrate leisure and entertainment, develop intelligence and exercise fitness are becoming more and more popular among the public.

Recently, the video game and e-sports industries are developed vigorously. Consequently, many video game companies are also continuously developing new next-generation consoles. For example, a Wii console was developed by Nintendo, a PlayStation console was developed by Sony, or an Xbox console was developed by Microsoft. Regardless of the development of the game console, a game controller (i.e., a gamepad) is still one of the necessary input devices for various game consoles. The user can hold and operate the game controller to play the video games.

In accordance with the existing technologies, the game controllers of various game consoles are gradually designed according to the ergonomic demands. Generally, the palm sizes and the finger lengths of different users are different. Since the game controller has a fixed size, the game controller may only comply with the palms and fingers of specified users. In other words, the size of the game controller fails to comply with the operating requirements or preferences of some users.

For solving the drawbacks of the conventional technologies, it is important to provide an improved game controller in order to comply with the operating requirements or preferences of different users.

SUMMARY OF THE INVENTION

An object of the present invention provides a game controller. The altitude of an operation element of the game controller is adjustable. When the game controller is used by any user, the user may adjust the altitude of the operation element according to the usual practice or the preference. Consequently, during the process of playing games with the game controller, the satisfactory operating feel can be maintained.

In accordance with an aspect of the present invention, a game controller is provided. The game controller includes a casing, a base, a movable seat, a signal control module and an operation element. The casing includes an upper cover and a lower cover. Moreover, at least one operation hole is formed in the upper cover. The base includes a main body, at least one driving module and at least one first position-limiting structure. The main body is fixed on an inner surface of the upper cover. The at least one driving module is installed on the main body. The at least one first position-limiting structure is disposed on the main body. The movable seat is disposed over the base. The movable seat includes at least one linking part and at least one second position-limiting structure. The at least one linking part is connected with the corresponding driving module. The at least one second position-limiting structure cooperates with the corresponding first position-limiting structure, so that the movable seat is movable along the at least one first position-limiting structures. The signal control module is installed on the movable seat. The operation element is connected with the signal control module. A portion of the operation element is exposed to the at least one operation hole. The at least one driving module drives a position-limiting movement of the movable seat relative to the base through the at least one linking part, so that an altitude of the operation element is adjustable In an embodiment, the at least one linking part and the at least one second position-limiting structure are protrusion ear structures that are externally extended from external surfaces of the movable seat. Each of the at least one linking part has two opposed threaded holes, and each of the at least one second position-limiting structure has two opposed position-limiting holes.

In an embodiment, each of the at least one driving module includes a step motor and a threaded rod. The threaded rod is connected with the step motor. The threaded rod is penetrated through the two threaded holes sequentially. An external thread segment of the threaded rod is engaged with internal thread segments of the two threaded holes. The step motor drives rotation of the threaded rod, so that the threaded rod is moved in an engaged manner to drive the movement of the movable seat.

In an embodiment, each of the at least one first position-limiting structure is a support bar, and the support bar is penetrated through the two position-limiting holes sequentially.

In an embodiment, the game controller further includes a position-limiting seat, and the position-limiting seat includes a top part, a bottom part and a lateral wall part. The lateral wall part is connected with the top part and the bottom part. A receiving space running through the top part and the bottom part is defined by the lateral wall part. The bottom part is connected with the main body of the base. The movable seat is disposed within the receiving space.

In an embodiment, the lateral wall part includes at least one first pocket hole and at least one second pocket hole, which are open from the bottom part to the top part. The at least one first pocket hole is aligned with the at least one linking part, and the at least one second pocket hole is aligned with the at least one second position-limiting structure. Consequently, the at least one linking part is inserted into the at least one first pocket hole, and the at least one second position-limiting structure is inserted into the at least one second pocket hole.

In an embodiment, the top part of the position-limiting seat includes at least one first positioning hole corresponding to the at least one threaded rod and at least one second positioning hole corresponding to the support bar. An end of the threaded rod away from the step motor is penetrated through the corresponding first positioning hole. An end of the support bar way from the main body of the base is inserted into the corresponding second positioning hole.

In an embodiment, the at least one second position-limiting structure is stopped by the top part of the position-limiting seat, so that a movable range of the movable seat is limited.

In an embodiment, the movable seat includes an installation space, and the signal control module is installed within the installation space.

In an embodiment, the signal control module includes a circuit board and a controlling element. The controlling element is installed on the circuit board. The controlling element includes a coupling part. The coupling part is connected with the operation element.

In an embodiment, each of the at least one second position-limiting structure is a position-limiting recess that is concavely formed in an external surface of the movable seat.

In an embodiment, each of the at least one first position-limiting structure is a position-limiting guide post, and a shape of a cross section of the position-limiting guide post matches a shape of a cross section of the corresponding position-limiting recess. Consequently, the position-limiting guide post is slidably engaged with the corresponding position-limiting recess.

In an embodiment, the cross section of the position-limiting guide post and the cross section of the corresponding position-limiting recess have semi-elliptic shapes, similar-circular shapes or trapezoid shapes.

In an embodiment, the lower cover includes an adjusting switch. By operating the adjusting switch to drive and control the step motor, the threaded rod is rotated in a clockwise direction or a counterclockwise direction.

In an embodiment, the operation element is a joystick, a directional key or a button.

From the above descriptions, the game controller of the present invention is advantageous over the conventional technologies. By operating the adjusting switch of the game controller, the altitude of the operation element can be quickly and finely tuned. That is, the game controller can comply with the usual practices or the preferences of different users. Consequently, during the process of playing games with the game controller, the satisfactory operating feel can be maintained.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
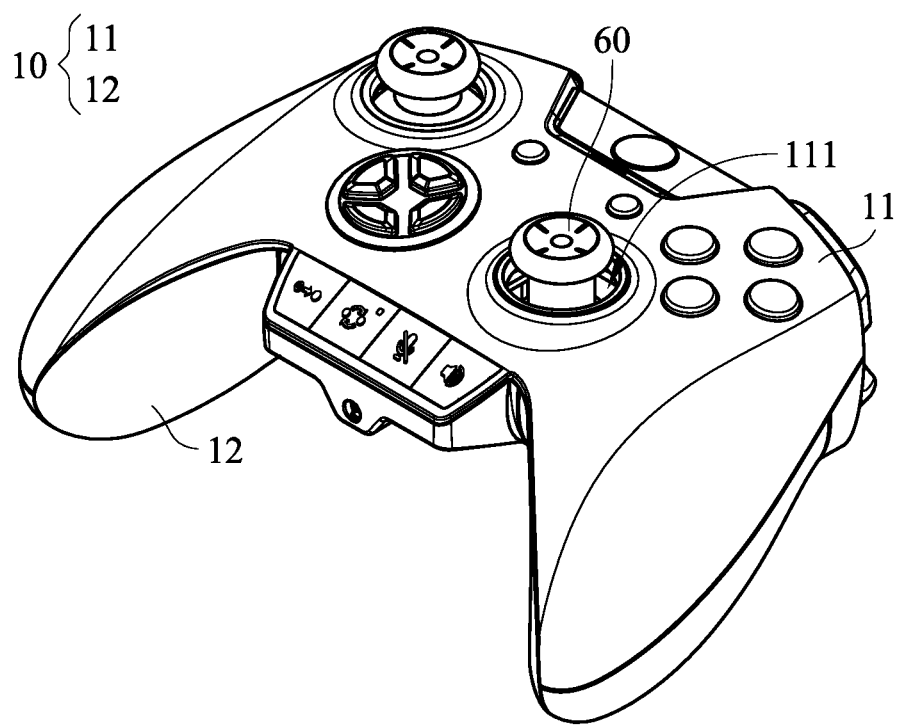
FIG. 1A is a schematic perspective view illustrating a game controller according to an embodiment of the present invention and taken along a viewpoint.
Figure 1B:
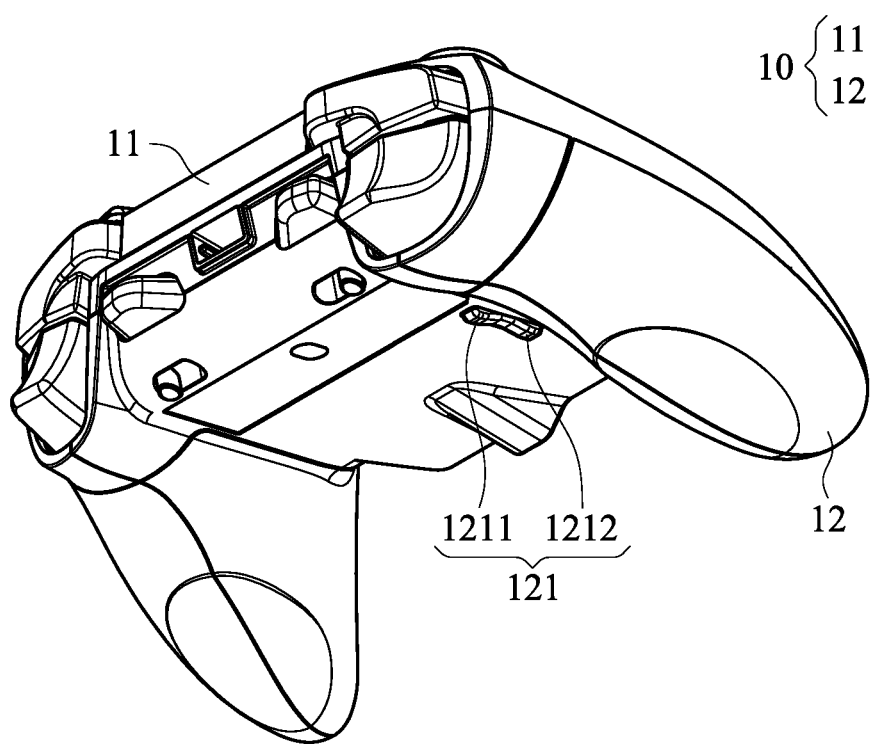
FIG. 1B is a schematic perspective view illustrating the game controller according to the embodiment of the present invention and taken along another viewpoint.

Please refer to FIGS. 1A and 1B. FIG. 1A is a schematic perspective view illustrating a game controller according to an embodiment of the present invention and taken along a viewpoint. FIG. 1B is a schematic perspective view illustrating the game controller according to the embodiment of the present invention and taken along another viewpoint. In this embodiment, the game controller 1 comprises a casing 10. The casing 10 comprises an upper cover 11 and a lower cover 12. The upper cover 11 and the lower cover 12 are detachably coupled to each other. An operation hole 111 is formed in an external surface of the upper cover 11. An operation element 60 is protruded from the external surface of the upper cover 11 and disposed within the operation hole 111. An adjusting switch 121 is disposed on an external surface of the lower cover 12. In an embodiment, the operation element 60 is a joystick. Moreover, two holding parts are located at two opposite lateral sides of the game controller 1 so as to be held by the user. The adjusting switch 121 comprises an up-switch part 1211 and a down-switch part 1212. In addition to the operation element 60, other types of joysticks, directional keys, buttons or hot keys maybe installed on the upper cover 11. When the game controller 1 is held by the user, the control keys and the joysticks on the operation interface of the upper cover 11 may be operated with thumbs and the up-switch part 1211 or the down-switch part 1212 of the adjusting switch 121 may be pressed with an index finger or a middle finger.

Figure 2:
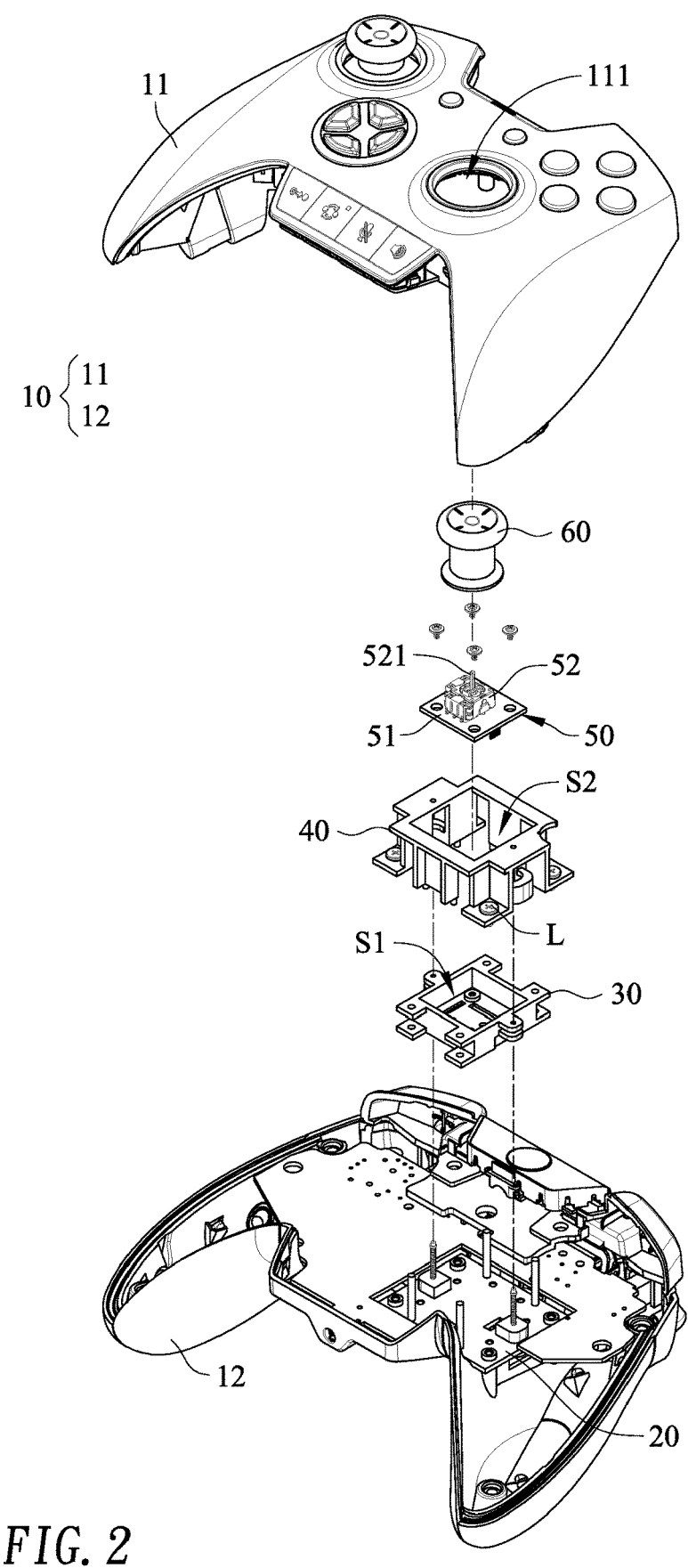
FIG. 2 is a schematic explode view illustrating the game controller according to the embodiment of the present invention.

Please refer to FIG. 2. FIG. 2 is a schematic explode view illustrating the game controller according to the embodiment of the present invention. As shown in FIG. 2, the game controller 1 further comprises a base 20, a movable seat 30, a position-limiting seat 40 and a signal control module 50, which are disposed within an accommodation space between the upper cover 11 and the lower cover 12. In an embodiment, the base 20 is combined with the position-limiting seat 40 and fixed on an inner surface of the lower cover 12 through fastening elements L (e.g., screws). The movable seat 30 is disposed within a receiving space S2 of the position-limiting seat 40 and located over the base 20. The signal control module 50 is disposed within an installation space S1 of the movable seat 30. In an embodiment, the signal control module 50 comprises a circuit board 51 and a controlling element 52. The controlling element 52 is installed on the circuit board 51. The controlling element 52 comprises a coupling part 521. The coupling part 521 is connected with the operation element 60. Consequently, a portion of the operation element 60 is exposed to the operation hole 111 and the operation element 60 is operable by the user's finger. When the operation element 60 is operated by the user, the signal control module 50 issues a corresponding control signal.

Figure 3A:
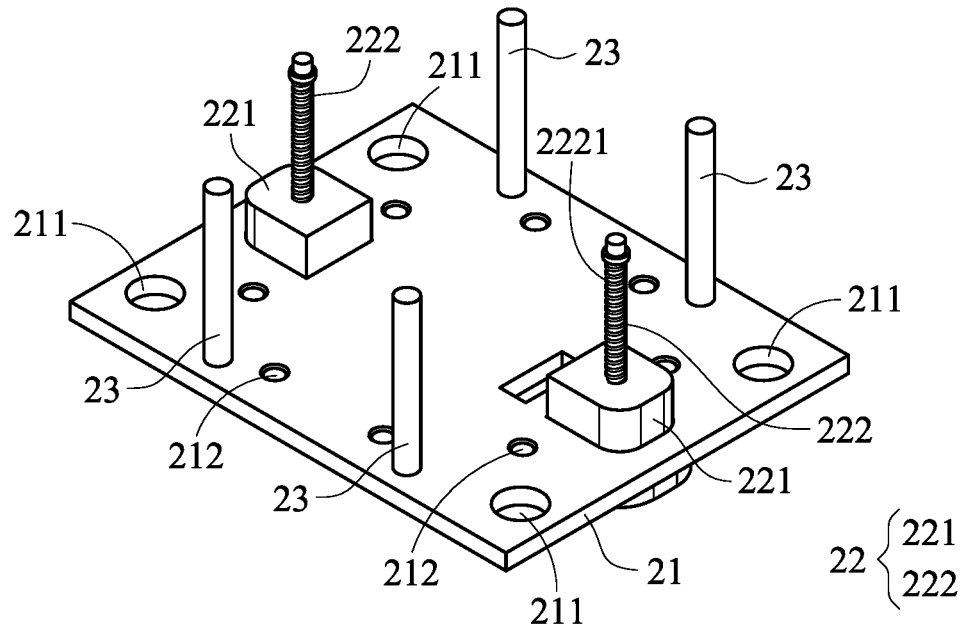
FIG. 3A is a schematic perspective view illustrating the base of the game controller according to the embodiment of the present invention.

Please refer to FIG. 2 and FIG. 3A. FIG. 3A is a schematic perspective view illustrating the base of the game controller according to the embodiment of the present invention. As shown in FIG. 3A, the base 20 comprises a main body 21, at least one driving module 22 and at least one first position-limiting structure 23. The at least one driving module 22 and the at least one first position-limiting structure 23 are disposed on a surface of the main body 21. In addition, the at least one driving module 22 is electrically connected with the adjusting switch 121 (see FIG. 1B). In this embodiment, the base 20 comprises two driving assemblies 22 and four first position-limiting structures 23. The two driving assemblies 22 are opposed to each other. Two of the four first position-limiting structures 23 are opposed to each other. The other two first position-limiting structures 23 are opposed to each other. The driving module 22 comprises a step motor 221 and a threaded rod 222. The threaded rod 222 is connected with the step motor 221. The threaded rod 222 has an external thread segment 2221. By operating the up-switch part 1211 or the down-switch part 122 of the adjusting switch 121, the step motor 121 is driven and controlled to rotate the threaded rod 222 in a clockwise direction or a counterclockwise direction.

In an embodiment, the first position-limiting structure 23 is a cylindrical support bar. Moreover, plural fastening holes 211 and plural main positioning holes 212 run through the main body 21 of the base 20. In this embodiment, the plural fastening holes 211 are located at four corners of the main body 21, respectively. Each main positioning hole 212 is arranged between the nearby driving module 22 and the nearby first position-limiting structure 23 or arranged between two adjacent first position-limiting structures 23.

Figure 3B:
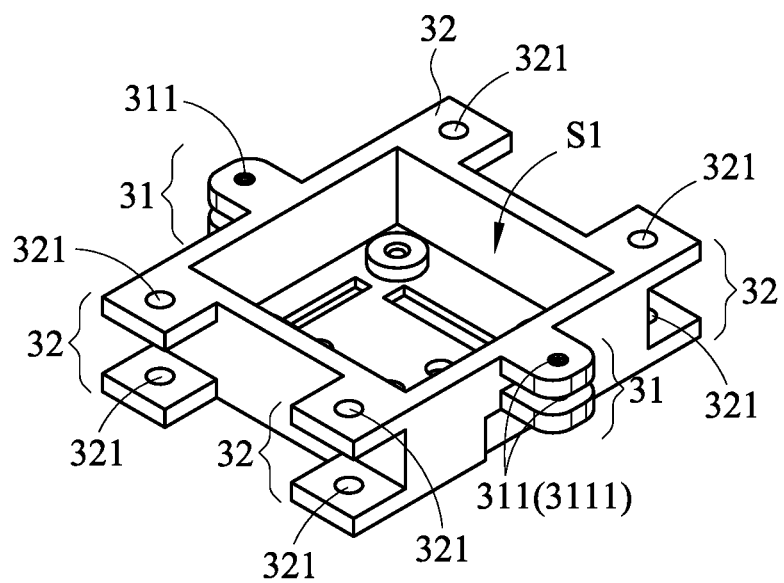
FIG. 3B is a schematic perspective view illustrating the movable seat of the game controller according to the embodiment of the present invention.

Please refer to FIG. 2 and FIG. 3B. FIG. 3B is a schematic perspective view illustrating the movable seat of the game controller according to the embodiment of the present invention. As shown in FIG. 3B, the movable seat 30 comprises the installation space S1, at least one linking part 31 and at least one second position-limiting structure 32. The linking part 31 is connected with the corresponding driving module 22. Each second position-limiting structure 32 cooperates with the corresponding first position-limiting structure 23. Consequently, the movable seat 30 can be moved along the first position-limiting structures 23. In this embodiment, the movable seat 30 comprises the two linking parts 31 and four second position-limiting structures 32. The two linking parts 31 and the four second position-limiting structures 32 are protrusion ear structures that are externally extended from external surfaces of the movable seat 30. The two linking parts 31 are disposed on a first lateral external surface and a second lateral external surface of the movable seat 30, which are opposed to each other. Two of the four second position-limiting structures 32 are disposed on a third lateral external surface of the movable seat 30, and the other two of the four second position-limiting structures 32 are disposed on a fourth lateral external surface of the movable seat 30. The third lateral external surface and the four lateral external surface of the movable seat 30 are opposed to each other. The linking part 31 has two opposed threaded holes 311 corresponding to the threaded rod 222 (see FIG. 3A). Each threaded hole 311 has an internal thread segment 3111 corresponding to the external thread segment 2221 of the threaded rod 222. The second position-limiting structure 32 has two position-limiting holes 321 corresponding to the first position-limiting structure 23 (e.g., the support bar as shown in FIG. 3A).

Figure 3C:
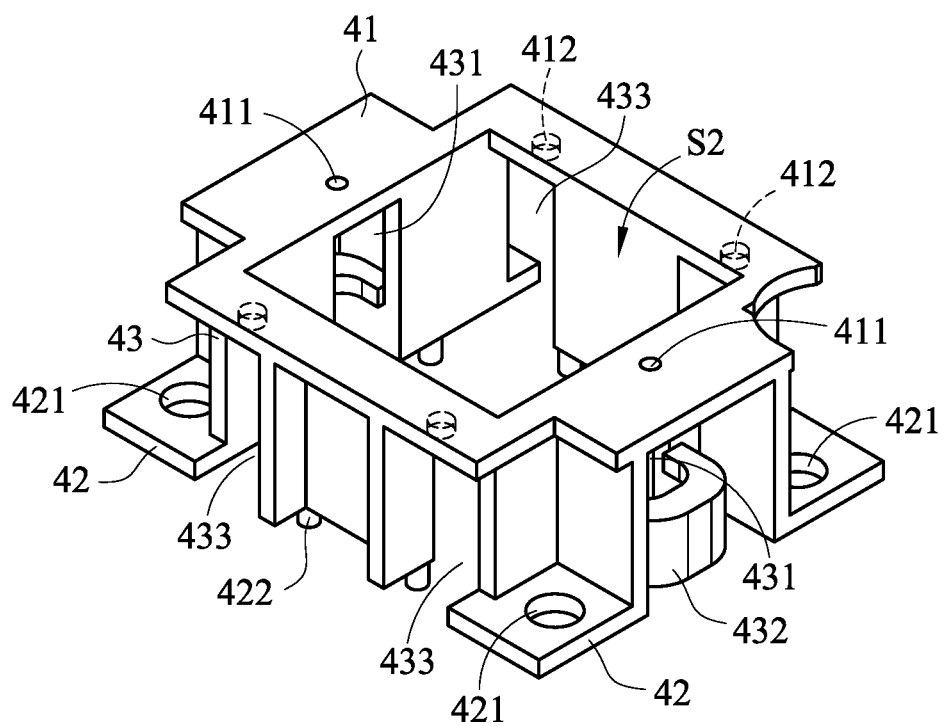
FIG. 3C is a schematic perspective view illustrating the position-limiting seat of the game controller according to the embodiment of the present invention.

Please refer to FIG. 2 and FIG. 3C. FIG. 3C is a schematic perspective view illustrating the position-limiting seat of the game controller according to the embodiment of the present invention. As shown in FIG. 3C, the position-limiting seat 40 comprises a top part 41, a bottom part 42 and a lateral wall part 43. The lateral wall part 43 is connected with the top part 41 and the bottom part 42. The receiving space S2 running through the top part 41 and the bottom part 42 is defined by the lateral wall part 43. The top part 41 comprises at least one first positioning hole 411 and at least one second positioning hole 412. The first positioning hole 411 runs through the top part 41. The second positioning hole 412 is formed in an edge of a bottom side of the top part 41. The first positioning hole 411 and the second positioning hole 412 are respectively aligned with the corresponding threaded rod 222 and the corresponding first position-limiting structure 23 (see FIG. 3A). Moreover, four perforations 421 corresponding to the fastening holes 211 (see FIG. 3A) are located at four corners of the bottom part 42, and the bottom part 42 comprises plural main positioning posts 422 corresponding to the main positioning holes 212 (see FIG. 3A).

Moreover, the lateral wall part 43 of the position-limiting seat 40 comprises two first pocket holes 431 and four second pocket holes 433, which are open from the bottom part 42 to the top part 41. The two first pocket holes 431 are opposed to each other. Two of the four second pocket holes 433 are opposed to each other. The other two second pocket holes 433 are opposed to each other. The first pocket holes 431 are respectively aligned with the corresponding linking parts 31 of the movable seat 30 (see FIG. 3B). The second pocket holes 433 are respectively aligned with the corresponding second position-limiting structures 32 of the movable seat 30 (see FIG. 3B). Moreover, the lateral wall part 43 of the position-limiting seat 40 further comprises two protective covers 432. Each protective cover 432 is protruded from the lateral wall part 43 and located outside an end of the corresponding first pocket hole 431 near the bottom part 42. The shape of the protective cover 432 matches the shape of the step motor 221 of the corresponding driving module 22 (see FIG. 3A). After the associated components are assembled, the step motor 221 is covered and protected by the corresponding protective cover 432.

Figure 4:
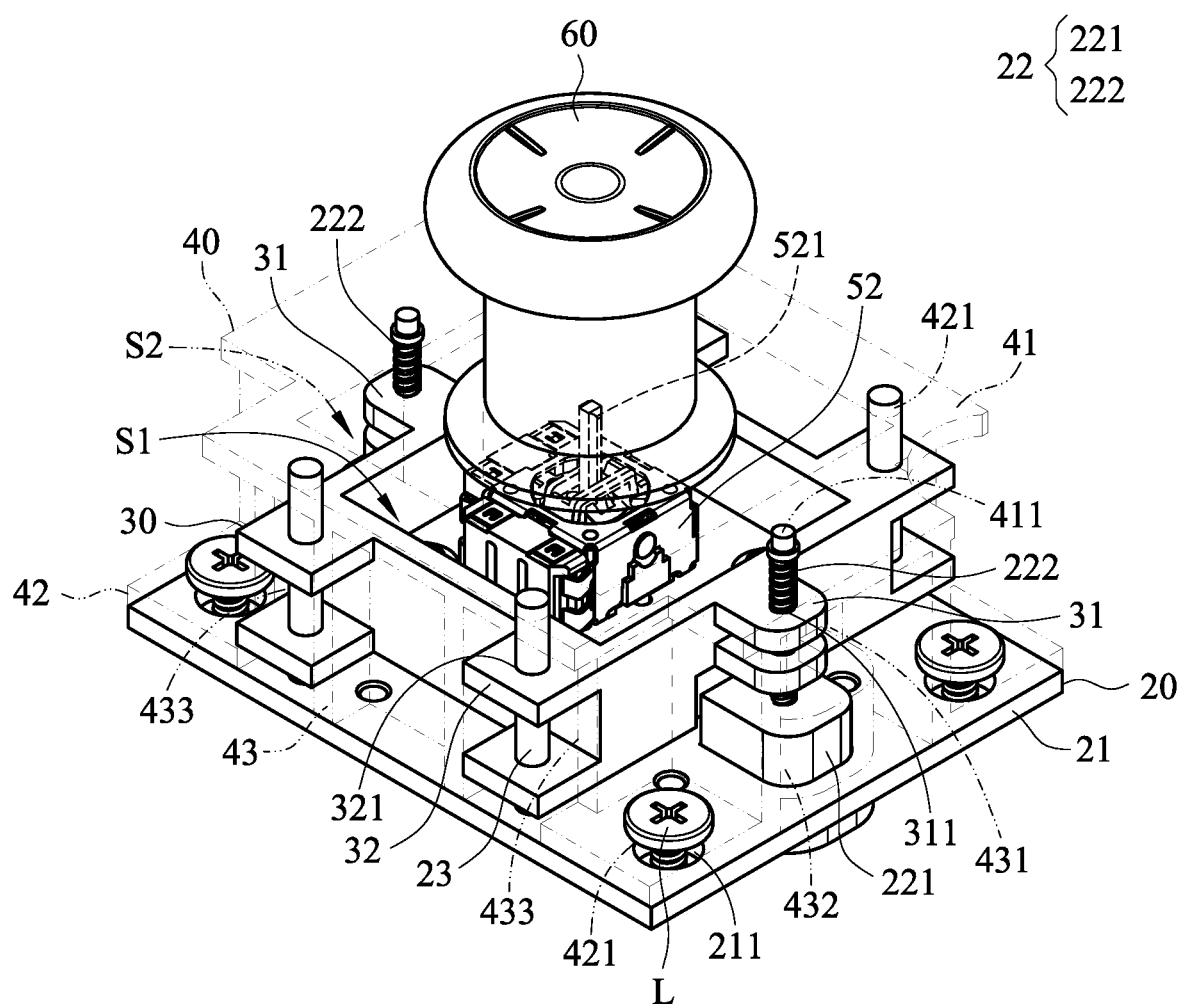
FIG. 4 is a schematic perspective view illustrating the assembled structure of a joystick device of the game controller according to the embodiment of the present invention.

FIG. 4 is a schematic perspective view illustrating the assembled structure of a joystick device of the game controller according to the embodiment of the present invention. As shown in FIG. 4, the movable seat 30 is disposed within a receiving space S2 of the position-limiting seat 40. The two linking parts 31 are respectively inserted into the corresponding first pocket holes 431. The four second position-limiting structures 32 are respectively inserted into the corresponding second pocket holes 433. Each threaded rod 222 of the driving module 22 is penetrated through the corresponding two threaded holes 311 of the linking part 31 sequentially. An end of the threaded rod 222 away from the step motor 221 is penetrated through the corresponding first positioning hole 411 of the top part 41 of the position-limiting seat 40. The external thread segment 2221 of the threaded rod 222 (see FIG. 3A) and the internal thread segment 3111 of the corresponding threaded hole 311 (see FIG. 3B) are engaged with each other. The first position-limiting structure 23 (i.e., the support bar) is penetrated through the corresponding two position-limiting holes 321 of the corresponding position-limiting structure 32, respectively. An end of the first position-limiting structure 23 away from the main body 21 of the base 20 is inserted into the corresponding second positioning hole 412.

The main positioning posts 422 of the position-limiting seat 40 (see FIG. 3C) are penetrated through the corresponding main positioning holes 212 of the main body 21 (see FIG. 3C). Consequently, the position-limiting seat 40 is positioned on the main body 21. Then, fastening elements L are sequentially penetrated through the corresponding perforations 421 of the position-limiting seat 40 and the corresponding fastening holes 211 of the base 20 and tightened into the corresponding fastening holes 211. Consequently, the base 20 and the position-limiting seat 40 are combined together, and the base 20 is fixed on the inner surface of the lower cover 12 (see FIG. 2).

Figure 5A:
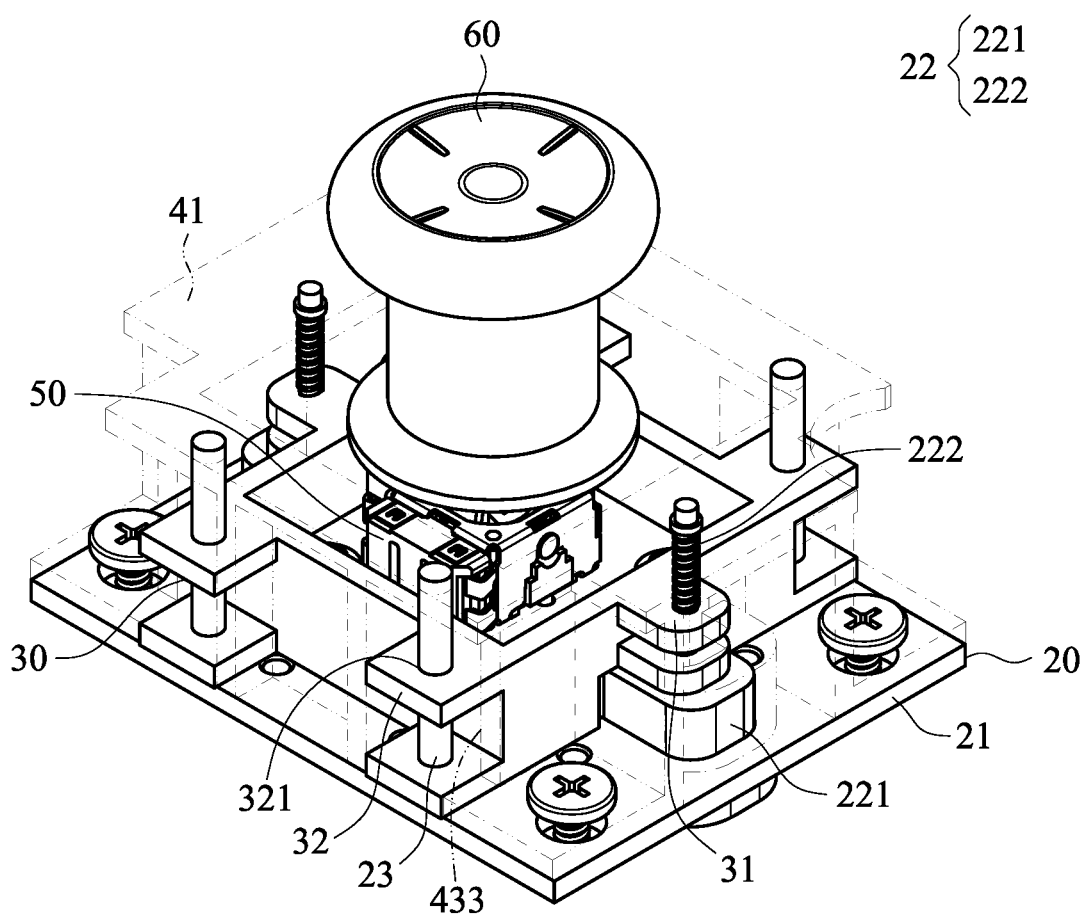
FIGS. 5A and 5B are schematic perspective views illustrating the actions of adjusting the altitude of the joystick device of the game controller according to the embodiment of the present invention.
Figure 5B:
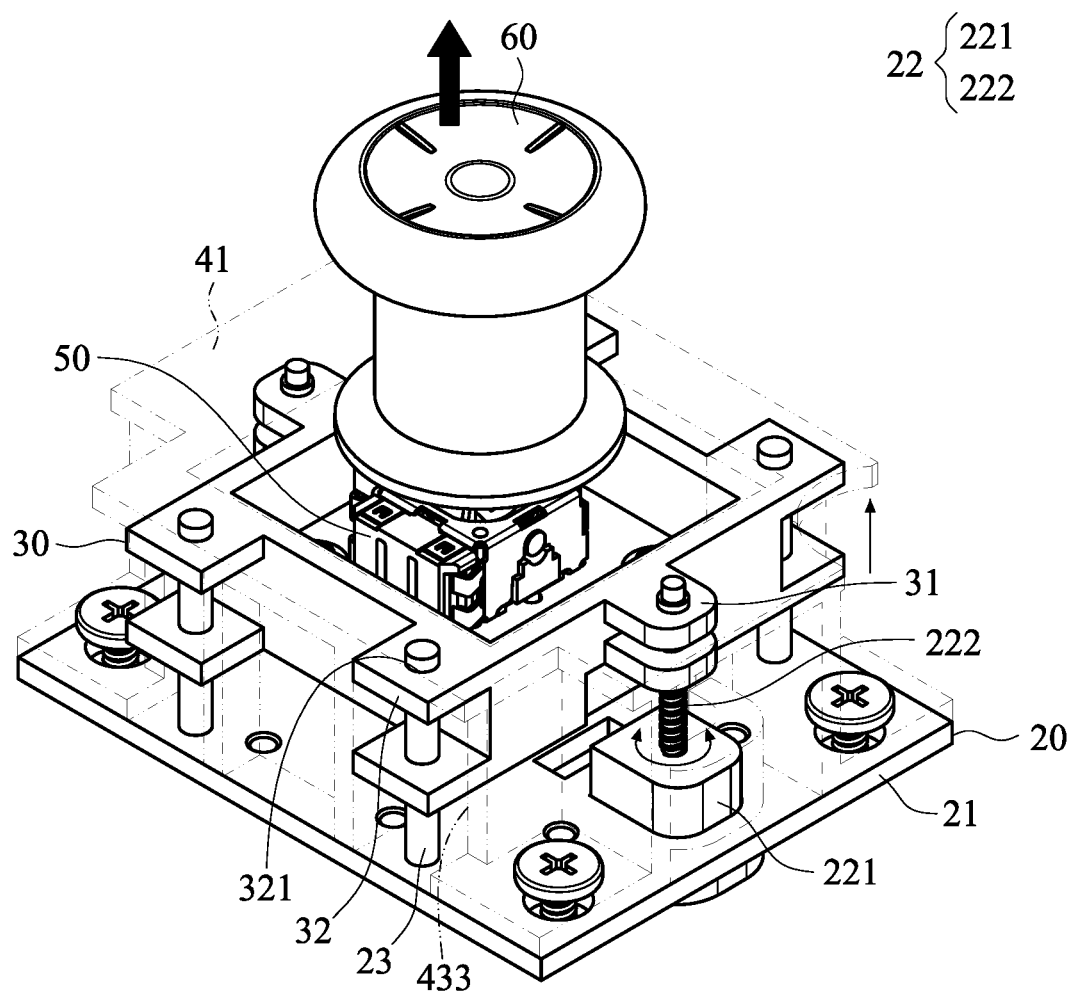

Please refer to FIGS. 1A, 1B, 5A and 5B. FIGS. 5A and 5B are schematic perspective views illustrating the actions of adjusting the altitude of the joystick device of the game controller according to the embodiment of the present invention.

As shown in FIG. 5A, the movable seat 30 is in contact with the main body 21 of the base 2. Meanwhile, the operation element 60 is located at the lowest altitude. If the user feels that the altitude of the operation element 60 is too low, the user may press the up-switch part 1211 of the adjusting switch 121 with the fingertip of the index finger or the middle finger. Please refer to FIG. 5B. After the up-switch part 1211 of the adjusting switch 121 is pressed, the step motor 221 is enabled to drive the rotation of the threaded rod 222 in the clockwise direction. As mentioned above, the external thread segment 2221 of the threaded rod 222 is engaged with the internal thread segments of the corresponding threaded holes 311. Consequently, in response to the clockwise rotation of the threaded rod 222, the linking part 31 is correspondingly moved and the movable seat 30 is moved upwardly through the linking part 31. In other words, the movable seat 30 is gradually moved away from the main body 21 of the base 2. Moreover, while the movable seat 30 is moved upwardly, the second position-limiting structures 32 are stopped by the top part 41 of the position-limiting seat 40. Consequently, the movable range of the movable seat 30 is limited. As shown in FIG. 5B. The second position-limiting structures 32 of the movable seat 30 is in contact with the edges of the bottom side of the top part 41. Meanwhile, the operation element 60 is ascended to the highest altitude.

On the other hand, if the user feels that the altitude of the operation element 60 is too high, the user may press the down-switch part 1212 of the adjusting switch 121 with the fingertip of the index finger or the middle finger. After the down-switch part 1212 of the adjusting switch 121 is pressed, the step motor 221 is enabled to drive the rotation of the threaded rod 222 in the counterclockwise direction. Consequently, in response to the counterclockwise rotation of the threaded rod 222, the linking part 31 is correspondingly moved and the movable seat 30 is moved downwardly through the linking part 31. In other words, the movable seat 30 is gradually moved away from the top part 41 of the position-limiting seat 40.

In other words, the user may press the up-switch part 1211 or the down-switch part 1212 of the adjusting switch 121 to drive the step motor 221. Consequently, the threaded rod 222 is rotated in the clockwise direction or the counterclockwise direction. As the movable seat 30 is moved with the linking part 31 upwardly or downwardly, the movable seat 30 can be maintained at any position between the top part 41 of the position-limiting seat 40 and the main body of the base 2. Consequently, the altitude of the operation element 60 can be adjusted according to the practical requirements.

Moreover, since the movable seat 30 is moved along the threaded rod 222 in an engaged manner through the linking part 31, the altitude of the operation element 60 can be finely tuned. In the above embodiment, the operation element 60 is a joystick. It is noted that the example of the operation element 60 is not restricted. For example, in another embodiment, the operation element 60 is a directional key or a button.

Figure 6:
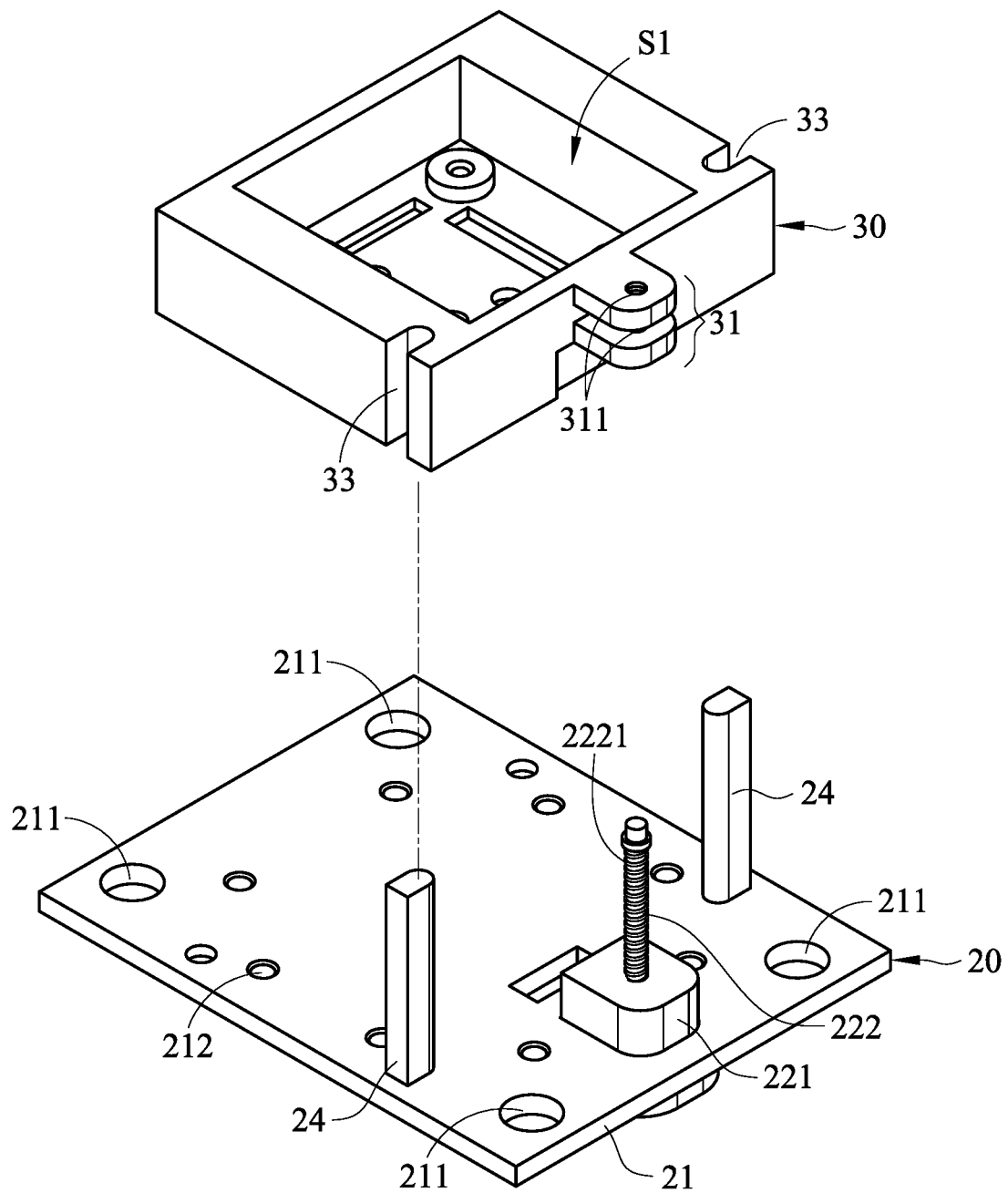
FIG. 6 is a schematic perspective view illustrating a variant example of the base and the movable seat of the game controller according to the embodiment of the present invention.

Please refer to FIG. 6. FIG. 6 is a schematic perspective view illustrating a variant example of the base and the movable seat of the game controller according to the embodiment of the present invention. In FIG. 6, the structures and functions of the components of the base 20 and the movable seat 30 that are similar to the those of FIGS. 3A and 3B are not redundantly described herein. In comparison with FIGS. 3A and 3B, two opposed first position-limiting structures 24 and one driving module 22 are installed on the main body 21 of the base 20. The first position-limiting structures 24 are position-limiting guide posts. The second position-limiting structures 33 are position-limiting recesses that are concavely formed in the external surface of the movable seat 30. The cross section of the first position-limiting structure 24 and the cross section of the second position-limiting structure 33 have matching shapes. Consequently, the first position-limiting structure 24 is slidably engaged with the second position-limiting structure 33. For example, the cross section of the first position-limiting structure 24 and the cross section of the second position-limiting structure 33 have semi-elliptic shapes or similar-circular shapes. The movable seat 30 is clamped by the two first position-limiting structures 24. Consequently, during the engaged movement of the movable seat 30, the movable seat 30 is not detached from the first position-limiting structures 24.

Figure 7:
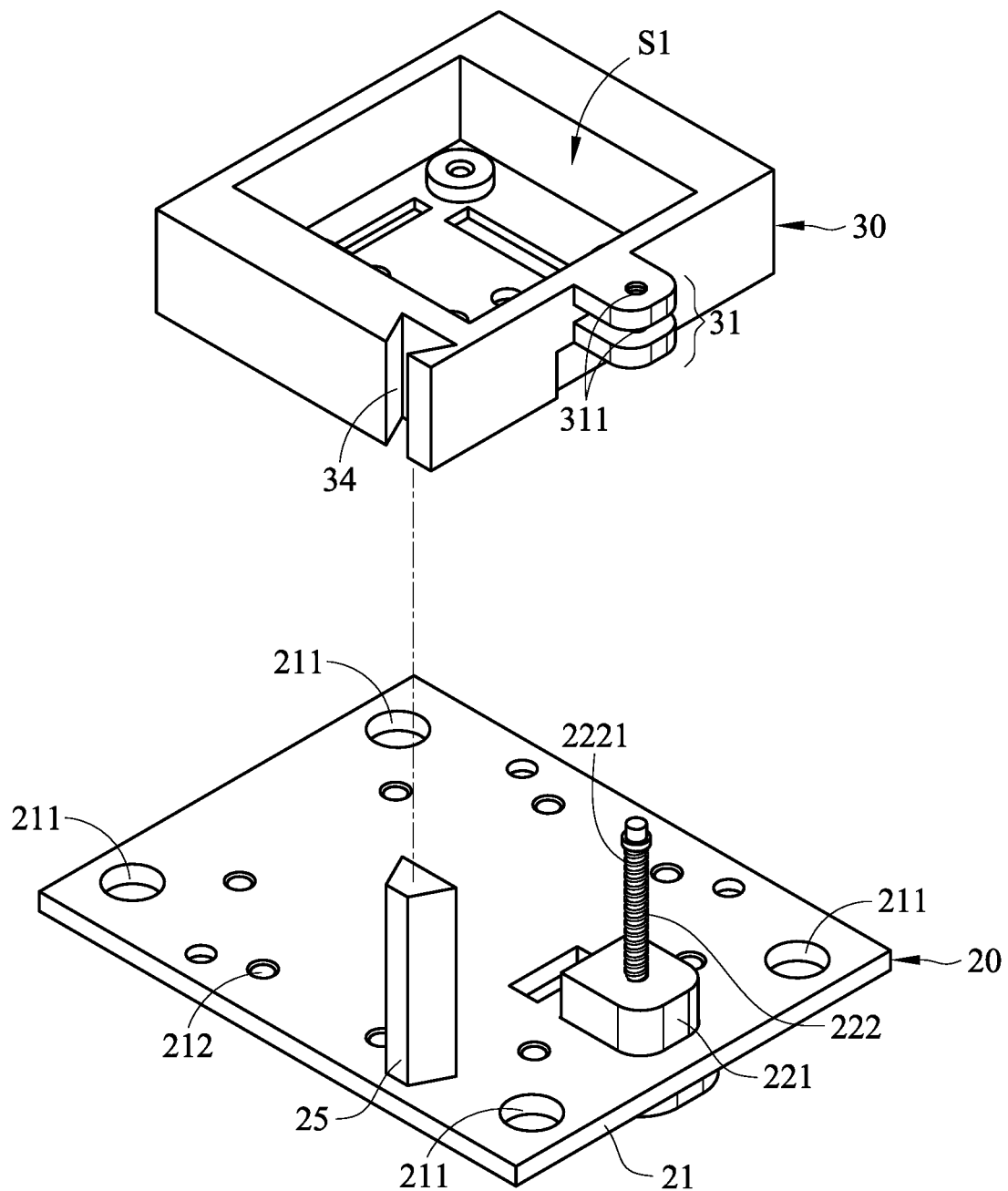
FIG. 7 is a schematic perspective view illustrating another variant example of the position-limiting seat of the game controller according to the embodiment of the present invention.

Please refer to FIG. 7. FIG. 7 is a schematic perspective view illustrating another variant example of the base and the movable seat of the game controller according to the embodiment of the present invention. In FIG. 7, the structures and functions of the components of the base 20 and the movable seat 30 that are similar to the those of FIGS. 3A and 3B are not redundantly described herein. In comparison with FIGS. 3A and 3B, one first position-limiting structure 25 and one driving module 22 are installed on the main body 21 of the base 20. The first position-limiting structure 25 is also a position-limiting guide post. The second position-limiting structures 34 are also position-limiting recesses that are concavely formed in the external surface of the movable seat 30. The cross section of the first position-limiting structure 25 and the cross section of the second position-limiting structure 34 have matching shapes. Consequently, the first position-limiting structure 25 is slidably engaged with the second position-limiting structure 34. For example, the cross section of the first position-limiting structure 25 and the cross section of the second position-limiting structure 34 have trapezoid shapes. Consequently, during the engaged movement of the movable seat 30, the movable seat 30 is not detached from the first position-limiting structures 25.

From the above descriptions, the game controller 1 of the present invention is advantageous over the conventional technologies. By operating the adjusting switch 121 of the lower cover 12, the altitude of the operation element 60 can be quickly and finely tuned according to the operation requirements of the user. When the game controller 1 is used by any user, the user may adjust the altitude of the operation element 60 according to the usual practice or the preference. Consequently, during the process of playing games with the game controller 1, the satisfactory operating feel can be maintained. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A game controller, comprising:
   a casing comprising an upper cover and a lower cover, wherein at least one operation hole is formed in the upper cover;
   a base comprising a main body, at least one driving module and at least one first position-limiting structure, wherein the main body is fixed on an inner surface of the upper cover, the at least one driving module is installed on the main body, and the at least one first position-limiting structure is disposed on the main body;
   a movable seat disposed over the base, and comprising at least one linking part and at least one second position-limiting structure, wherein the at least one linking part is connected with the corresponding driving module, and the at least one second position-limiting structure cooperates with the corresponding first position-limiting structure, so that the movable seat is movable along the at least one first position-limiting structures;
   a signal control module installed on the movable seat; and
   an operation element connected with the signal control module, wherein a portion of the operation element is exposed to the at least one operation hole,
   wherein the at least one driving module drives a position-limiting movement of the movable seat relative to the base through the at least one linking part, so that an altitude of the operation element is adjustable,
   wherein the at least one linking part and least one second postion-limiting structure are protrusion ear structures that are externally extended from external surfaces of the movable seat, wherein each of the at least one linking part has two opposed threaded holes, and each of the at least one second position-limiting structure has two opposed position-limiting holes.

2. The game controller according to claim 1, wherein each of the at least one driving module comprises a step motor and a threaded rod, wherein the threaded rod is connected with the step motor, the threaded rod is penetrated through the two threaded holes sequentially, and an external thread segment of the threaded rod is engaged with internal thread segments of the two threaded holes, wherein the step motor drives rotation of the threaded rod, so that the threaded rod is moved in an engaged manner to drive the movement of the movable seat.

3. The game controller according to claim 2, wherein each of the at least one first position-limiting structure is a support bar, and the support bar is penetrated through the two position-limiting holes sequentially.

4. The game controller according to claim 3, wherein the game controller further comprises a position-limiting seat, and the position-limiting seat comprises a top part, a bottom part and a lateral wall part, wherein the lateral wall part is connected with the top part and the bottom part, a receiving space running through the top part and the bottom part is defined by the lateral wall part, the bottom part is connected with the main body of the base, and the movable seat is disposed within the receiving space.

5. The game controller according to claim 4, wherein the lateral wall part comprises at least one first pocket hole and at least one second pocket hole, which are open from the bottom part to the top part, wherein the at least one first pocket hole is aligned with the at least one linking part, and the at least one second pocket hole is aligned with the at least one second position-limiting structure, so that the at least one linking part is inserted into the at least one first pocket hole, and the at least one second position-limiting structure is inserted into the at least one second pocket hole.

6. The game controller according to claim 5, wherein the top part of the position-limiting seat comprises at least one first positioning hole corresponding to the at least one threaded rod and at least one second positioning hole corresponding to the support bar, wherein an end of the threaded rod away from the step motor is penetrated through the corresponding first positioning hole, and an end of the support bar way from the main body of the base is inserted into the corresponding second positioning hole.

7. The game controller according to claim 6, wherein the at least one second position-limiting structure is stopped by the top part of the position-limiting seat, so that a movable range of the movable seat is limited.

8. The game controller according to claim 2, wherein the lower cover comprises an adjusting switch, wherein by operating the adjusting switch to drive and control the step motor, the threaded rod is rotated in a clockwise direction or a counterclockwise direction.

9. The game controller according to claim 1, wherein the movable seat comprises an installation space, and the signal control module is installed within the installation space.

10. The game controller according to claim 1, wherein the signal control module comprises a circuit board and a controlling element, wherein the controlling element is installed on the circuit board, the controlling element comprises a coupling part, and the coupling part is connected with the operation element.

11. The game controller according to claim 1, wherein the operation element is a joystick, a directional key or a button.

12. A game controller, comprising:
    a casing comprising an upper cover and a lower cover, wherein at least one operation hole is formed in the upper cover;
    a base comprising a main body, at least one driving module and at least one first position-limiting structure, wherein the main body is fixed on an inner surface of the upper cover, the at least one driving module is installed on the main body, and the at least one first position-limiting structure is disposed on the main body;
    a movable seat disposed over the base, and comprising at least one linking part and at least one second position-limiting structure, wherein the at least one linking part is connected with the corresponding driving module, and the at least one second position-limiting structure cooperates with the corresponding first position-limiting structure, so that the movable seat is movable along the at least one first position-limiting structures;
    a signal control module installed on the movable seat; and
    an operation element connected with the signal control module, wherein a portion of the operation element is exposed to the at least one operation hole,
    wherein the at least one driving module drives a position-limiting movement of the movable seat relative to the base through the at least one linking part, so that an altitude of the operation element is adjustable,
    wherein each of the at least one second position-limiting structure is a position-limiting recess that is concavely formed in an external surface of the movable seat.

13. The game controller according to claim 12, wherein each of the at least one first position-limiting structure is a position-limiting guide post, and a shape of a cross section of the position-limiting guide post matches a shape of a cross section of the corresponding position-limiting recess, so that the position-limiting guide post is slidably engaged with the corresponding position-limiting recess.

14. The game controller according to claim 13, wherein the cross section of the position-limiting guide post and the cross section of the corresponding position-limiting recess have semi-elliptic shapes, similar-circular shapes or trapezoid shapes.

\* \* \* \* \*